US009532296B2

(12) United States Patent
Noh et al.

(10) Patent No.: US 9,532,296 B2
(45) Date of Patent: Dec. 27, 2016

(54) METHOD OF MULTI-HOP COOPERATIVE COMMUNICATION FROM TERMINAL AND BASE STATION AND NETWORK FOR MULTI-HOP COOPERATIVE COMMUNICATION

(71) Applicant: Samsung Electronics Co., Ltd., Suwon-si (KR)

(72) Inventors: Won Jong Noh, Seoul (KR); Won Jae Shin, Seoul (KR); Kwang Hoon Han, Suwon-si (KR); Chang Yong Shin, Seoul (KR); Kyung Hun Jang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 44 days.

(21) Appl. No.: 14/132,220

(22) Filed: Dec. 18, 2013

(65) Prior Publication Data

US 2014/0171094 A1    Jun. 19, 2014

(30) Foreign Application Priority Data

Dec. 18, 2012  (KR) ........................ 10-2012-0148476

(51) Int. Cl.
*H04W 72/00* (2009.01)
*H04W 40/22* (2009.01)
(52) U.S. Cl.
CPC .................................. *H04W 40/22* (2013.01)
(58) Field of Classification Search
CPC ... H04L 29/08108; H04W 88/06; H04W 4/16; H04W 16/14; H04W 16/32; H04W 72/04; H04W 24/00

(Continued)

(56) References Cited

U.S. PATENT DOCUMENTS 6,115,409 A  *  9/2000  Upadhyay ............ H01Q 3/2605
                                                370/487
2002/0082079 A1*  6/2002  Mantyjarvi ............. A63F 13/10
                                                463/30

(Continued)

FOREIGN PATENT DOCUMENTS

EP         1 783 966 A2    5/2007
JP         2006-50371 A    2/2006

(Continued)

OTHER PUBLICATIONS

International Search Report issued Feb. 25, 2014 in counterpart International Patent Application No. PCT/KR2013/011815. (3 pages in English).

*Primary Examiner* — Christopher M Brandt
*Assistant Examiner* — Matthew Genack
(74) *Attorney, Agent, or Firm* — NSIP Law

(57) ABSTRACT

A method of multi-hop cooperative communication includes recognizing a plurality of relays capable of cooperating with one another to amplify or quantize and forward mixed signals received from a plurality of different nodes, selecting a transmission mode from a direct mode for transmission from a base station directly and a cooperation mode for transmission from the base station via the plurality of relays, transmitting data from the base station directly to a terminal through a first radio resource in the direct mode in response to the selected transmission mode being the direct mode, and transmitting data from the base station to the terminal via the plurality of relays through a second radio resource in the cooperation mode in response to the selected transmission mode being the cooperation mode.

23 Claims, 9 Drawing Sheets

(58) Field of Classification Search
USPC ......... 455/414.1, 426.1, 445, 448, 449, 450, 455/452.1–452.2
See application file for complete search history.

(56) References Cited

U.S. PATENT DOCUMENTS

| | | | |
|---|---|---|---|
| 2005/0123066 A1* | 6/2005 | Sarca | H03F 1/3247 375/296 |
| 2007/0104223 A1 | 5/2007 | Lee et al. | |
| 2008/0181318 A1 | 7/2008 | Kim et al. | |
| 2008/0247354 A1 | 10/2008 | Hsieh et al. | |
| 2009/0016290 A1 | 1/2009 | Chion et al. | |
| 2009/0028177 A1* | 1/2009 | Pettus | G06F 13/385 370/463 |
| 2009/0116422 A1 | 5/2009 | Chong et al. | |
| 2009/0135750 A1* | 5/2009 | Ratiu | G06F 17/30569 370/310 |
| 2009/0141719 A1* | 6/2009 | Roy | H04J 3/0685 370/390 |
| 2009/0175214 A1* | 7/2009 | Sfar | H04B 7/15592 370/315 |
| 2009/0176492 A1 | 7/2009 | Kwon et al. | |
| 2009/0310515 A1 | 12/2009 | Wang et al. | |
| 2011/0044295 A1 | 2/2011 | Li et al. | |
| 2011/0078453 A1* | 3/2011 | Mueck | H04L 9/0838 713/179 |
| 2012/0044815 A1 | 2/2012 | Geirhofer et al. | |
| 2015/0124613 A1* | 5/2015 | Yu | H04W 36/0016 370/235 |

FOREIGN PATENT DOCUMENTS

| | | |
|---|---|---|
| JP | 2006-295739 A | 10/2006 |
| KR | 10-2007-0040108 A | 4/2007 |
| KR | 10-0829221 B1 | 5/2008 |
| KR | 10-2008-0080816 A | 9/2008 |
| KR | 10-2009-0040240 A | 4/2009 |
| KR | 10-2010-0032001 A | 3/2010 |
| KR | 10-2011-0101690 A | 9/2011 |
| KR | 10-2012-0061722 A | 6/2012 |

* cited by examiner

FIG. 8
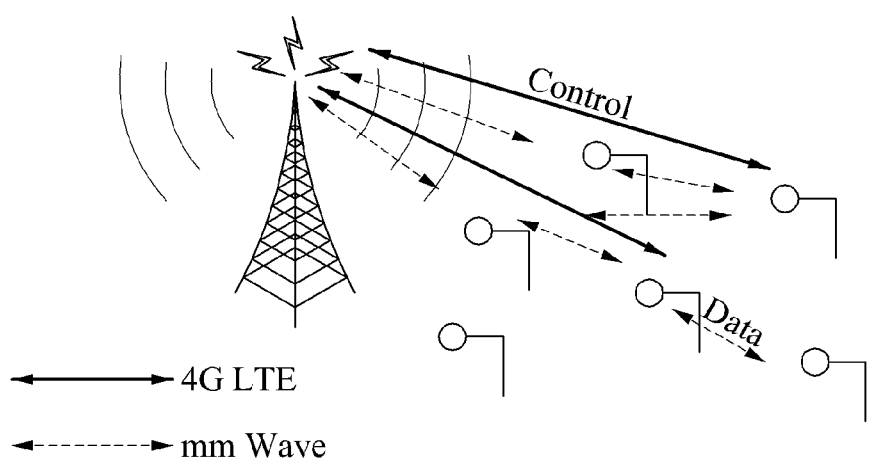
← → 4G LTE
←---→ mm Wave
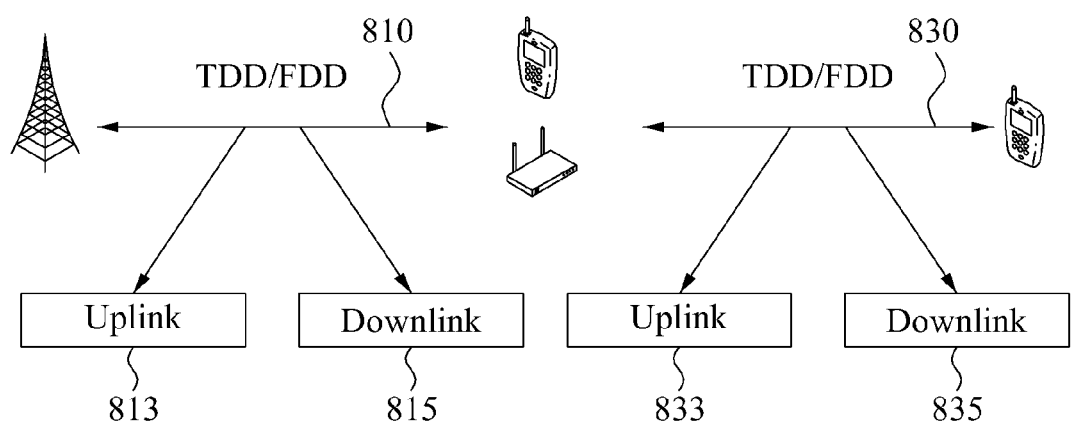

METHOD OF MULTI-HOP COOPERATIVE COMMUNICATION FROM TERMINAL AND BASE STATION AND NETWORK FOR MULTI-HOP COOPERATIVE COMMUNICATION

CROSS-REFERENCE TO RELATED APPLICATIONS

This application claims the benefit under 35 USC 119(a) of Korean Patent Application No. 10-2012-0148476 filed on Dec. 18, 2012, in the Korean Intellectual Property Office, the disclosure of which is incorporated herein by reference in its entirety for all purposes.

BACKGROUND

1. Field

This application relates to methods for multi-hop cooperative communication from a terminal and a base station and a network for multi-hop cooperative communication.

2. Description of Related Art

Communication environments are being challenged in two fundamental aspects. First, as a number of communication terminals, such as smart devices, sensor devices, and other communication terminals, continues to increase, an amount of traffic from these communication terminals is experiencing a rapid increase. Resolving this issue for cellular communication is particularly difficult. In addition, limited frequency resources are available to support an increasing number of communication terminals and an increasing amount of traffic, and moreover, there is a limitation on improvements to be made to the frequency efficiency in a band currently available. Accordingly, attempts have been conducted to find optical frequency resources in a new band of tens of gigahertz (GHz), but communication in this new band may be unstable due to a short transmission length cause by a high path loss.

As an alternative approach, a multi-hop multi-session-based peer-to-peer or point-to-multipoint communication architecture may allow efficient communication through sharing of frequency resources between terminals to the maximum. In this case, however, severe interference may occur due to overlapping use of frequency resources among the terminals.

SUMMARY

In one general aspect, a method of multi-hop cooperative communication includes recognizing a plurality of relays capable of cooperating with one another to amplify or quantize and forward mixed signals received from a plurality of different nodes; selecting a transmission mode from a direct mode for transmission from a base station directly and a cooperation mode for transmission from the base station via the plurality of relays; transmitting data from the base station directly to a terminal through a first radio resource in the direct mode in response to the selected transmission mode being the direct mode; and transmitting data from the base station to the terminal via the plurality of relays through a second radio resource in the cooperation mode in response to the selected transmission mode being the cooperation mode.

The terminal may be one of a plurality of terminals; and the transmitting of the data in the cooperation mode may include transmitting the data from the base station to the plurality of terminals via the plurality of relays through the second radio resource concurrently in the cooperation mode.

The transmitting of the data to the terminal in the cooperation mode may include setting relays operating in cooperation with the base station among the plurality of relays to be a cooperative group; and allocating a resource for the relays of the cooperative group.

The cooperative group may include at least two relays, and may be a cooperative group configured to support multi-hop multi-session concurrent transmission; and the allocating of the resource may include allocating the resource to the at least two relays of the cooperative group.

The method may further include selecting a cooperation mode from an amplify-and-forward mode, a decode-and-forward mode, and a compress-and-forward mode as a cooperation mode for the relays of the cooperative group.

The method may further include providing a cooperation context to the relays of the cooperative group.

The cooperation context may include any one or any combination of a cooperative group identification (ID), an allocated resource, and a cooperation mode for the relays of the cooperative group.

The method may further include transmitting data received from another base station to the relays of the cooperative group based on the cooperation context.

The first radio resource may include a long term evolution (LTE) frequency band.

The second radio resource may include a millimeter wave (mmWave) band.

In another general aspect, a non-transitory computer-readable storage medium stores a program for controlling a computer to perform the method described above.

In another general aspect, a method of multi-hop cooperative communication includes recognizing a plurality of relays capable of cooperating with one another to amplify or quantize and forward mixed signals received from a plurality of different nodes; selecting a transmission mode from a cooperation mode for transmission from a first terminal to a second terminal via the plurality of relays, and a direct mode for transmission from a base station directly to the second terminal; transmitting data from the base station directly to the second terminal through a first radio resource in the direct mode in response to the direct mode being the selected transmission mode; and transmitting data from the first terminal to the second terminal via the plurality of relays through a second radio resource in the cooperation mode in response to the cooperation mode being the selected transmission mode.

The method may further include receiving, from the first terminal, a request for data transmission to the second terminal, and information associated with a target quality of service (QoS) that the first terminal desires to receive in response to the request.

The transmitting of the data to the second terminal in the cooperation mode may include setting relays operating in cooperation with the base station among the plurality of relays to be a cooperative group; and allocating a resource for the relays of the cooperative group.

The cooperative group may include at least two relays, and may be a cooperative group configured to support multi-hop multi-session concurrent transmission; and the allocating of the resource may include allocating the resource to the at least two relays of the cooperative group.

The method may further include providing a cooperation context to the first terminal, and the cooperation context may include an allocated resource and a cooperative group identification (ID) for the relays of the cooperative group.

The method may further include selecting a cooperation mode from an amplify-and-forward mode, a decode-and-forward mode, and a compress-and-forward mode as a cooperation mode for the relays of the cooperative group.

The method may further include providing a cooperation context to the relays of the cooperative group.

The cooperation context may include any one or any combination of a cooperative group ID, an allocated resource, and a cooperation mode for the relays of the cooperative group.

In another general aspect, a method of multi-hop cooperative communication includes selecting a transmission mode from a cooperation mode for transmission from a first terminal desiring to transmit data to a second terminal via a plurality of relays, and a direct mode for transmission from a base station directly to the second terminal; transmitting the data from the base station directly to the second terminal through a first radio resource in the direct mode in response to the direct mode being the selected transmission mode; and transmitting the data from the first terminal to the second terminal via the plurality of relays through a second radio resource in the cooperation mode in response to the cooperation mode being the selected transmission mode.

The plurality of relays may be capable of cooperating with the base station or one another to amplify or quantize and forward mixed signals received from a plurality of different nodes.

The transmitting of the data to the second terminal in the cooperation mode may include setting relays operating in cooperation with one another among the plurality of relays to be a cooperative group configured to transmit the data to the second terminal; and allocating a resource for the relays of the cooperative group.

The cooperative group may include at least two relays, and may be a cooperative group configured to support multi-hop multi-session concurrent transmission; and the allocating of the resource for the relays may include allocating the resource to the at least two relays of the cooperative group.

The method may further include providing a cooperation context to the first terminal, and the cooperation context may include an allocated resource and a cooperative group identification (ID) for the relays of the cooperative group.

The method may further include providing a cooperation context to the relays of the cooperative group, and the cooperation context may include any one or any combination of a cooperative group ID, an allocated resource, and a cooperation mode for the relays of the cooperative group.

The method may further include selecting a cooperation mode from an amplify-and-forward mode, a decode-and-forward mode, and a compress-and-forward mode as a cooperation mode for the relays of the cooperative group.

The method may further include receiving a request for registration from the plurality of relays.

The method may further include receiving, from the first terminal, a request for data transmission to the second terminal, and information associated with a target quality of service (QoS) that the first terminal desires to receive in response to the request.

In another general aspect, a method of multi-hop cooperative communication includes transmitting, to a base station, a request by a first terminal for data transmission to a second terminal, and information associated with a target quality of service (QoS) that the first terminal desires to receive in response to the request; receiving, from the base station, a cooperation context in response to the request, the cooperation context including an allocated resource and a cooperative group identification (ID) for at least two relays operating in cooperation with one another set to be a cooperative group configured to support multi-hop multi-session concurrent transmission to transmit the data to the second terminal; and transmitting the data to the at least two relays of the cooperative group based on the cooperation context.

In another general aspect, a network for multi-hop cooperative communication includes a base station; a plurality of terminals; and a plurality of relays; and the base station, the plurality of terminals, and the plurality of relays are configured to use at least a portion of a first radio resource as a control channel to transmit control information for a first communication between the base station and the plurality of terminals, and between the base station and the plurality of relays, and use a second radio resource as a data channel to transmit data for the first communication.

The plurality of terminals and the plurality of relays may be further configured to use the second radio resource as a control channel for a second communication between the plurality of relays, and between the plurality of terminals and the plurality of relays.

The plurality of terminals and the plurality of relays may be further configured to use the first radio resource as a control channel for a second communication between the plurality of relays, and between the plurality of terminals and the plurality of relays.

The base station, the plurality of terminals, and the plurality of relays may be further configured to use the control channel for the first communication and the control channel for the second communication on a time division basis.

The plurality of relays may be capable of cooperating with one another to amplify or quantize and forward mixed signals received from a plurality of different nodes.

Each of the plurality of relays may include a linear filter configured to change a phase or an amplitude of an analog signal input to the relay; a quantizer configured to quantize the analog signal input to the relay; and an encoder configured to perform channel coding to transmit the quantized analog signal.

The linear filter may be further configured to change the phase or amplitude of the analog signal according to a coefficient for neutralizing interference in a multi-hop environment or a coefficient for maximizing an effective signal to interference plus noise ratio (SINR) between a final transmitting end and a final receiving end.

The quantizer may be further configured to adjust a quantization level and an accuracy of a quantization for the analog signal.

The first radio resource may include a long term evolution (LTE) frequency band.

The second radio resource may include a millimeter wave (mmWave) band.

In one general aspect, a communication method includes forming a cooperative relay group including a plurality of relays cooperating with one another to relay data received by the cooperative relay group; and transmitting data to the cooperative relay group.

The cooperative relay group may be configured to support multi-hop multi-session concurrent transmission.

The forming of the cooperative relay group may include transmitting a cooperation context to the plurality of relays of the cooperative relay group to form the cooperative relay group; and the cooperation context may include information identifying the cooperative relay group, and information enabling the plurality of relays to cooperate with one another to relay the data received by the cooperative relay group.

The method may further include selecting between a direct mode and a cooperation mode; transmitting data from a first device directly to a second device in response to the direct mode being selected; and forming the cooperative relay group and transmitting data from the first device to the second device via the cooperative relay group in response to the cooperation mode being selected.

The first device may be a base station, or a connection server, or a user terminal; and the second device may be a user terminal.

The transmitting of data from the first device directly to the second device may be performed using a first radio resource; and the transmitting of data from the first device to the second device via the cooperative relay group may be performed using a second radio resource.

Other features and aspects will be apparent from the following detailed description, the drawings, and the claims.

BRIEF DESCRIPTION OF THE DRAWINGS

FIG. 8 is a diagram illustrating an example of a control channel structure for a cooperative framework in a network for multi-hop cooperative communication including light relays.

DETAILED DESCRIPTION

Figure 1:
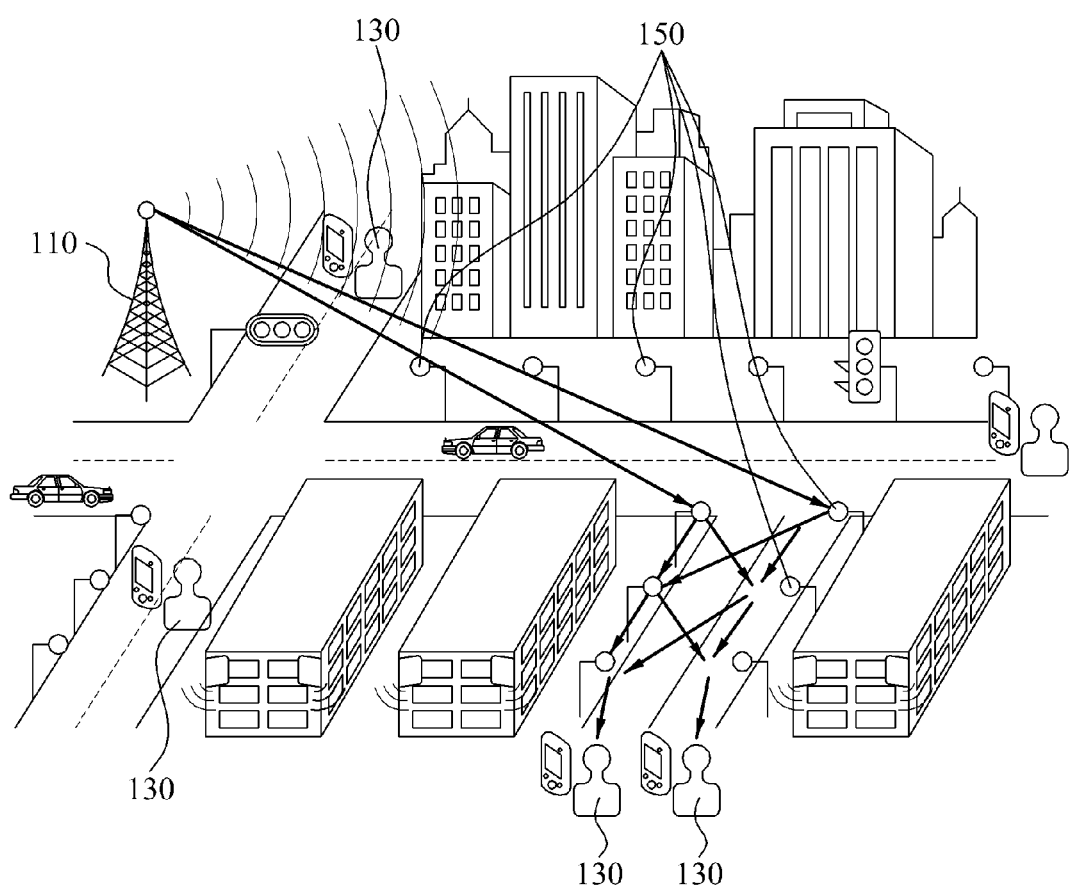
FIG. 1 is a diagram illustrating an example of a network for multi-hop cooperative communication including light relays.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein and may be changed as will be apparent to one of ordinary skill in the art, with the exception of operations necessarily occurring in a certain order. Also, description of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

FIG. 1 is a diagram illustrating an example of a network for multi-hop cooperative communication including light relays. Referring to FIG. 1, the network for multi-hop cooperative communication includes a base station (BS) 110, a plurality of terminals 130, and a plurality of light relays 150.

The BS 110 communicates with the plurality of terminals 130 and the plurality of light relays 150 using a broad frequency band, for example, a millimeter wave (mmWave) band, and a low frequency band, for example, a long term evolution (LTE) frequency band.

The BS 110 transmits data to the plurality of terminals 130 directly or via the plurality of light relays 150 depending on a transmission mode. To support concurrent communication with final receiving terminals, the BS 110 sets light relays 150 operating in cooperation with the BS 110 or with one another to be a cooperative group. The BS 110 allocates radio resources for a cooperative group of the light relays 150, and selects a cooperation mode for the cooperative group of the light relays 150.

Direct transmission of data from the BS 110 to the terminals 130 may be difficult in urban areas due to the frequency properties in the mmWave band.

The light relays 150 amplify or quantize and forward mixed signals received from a plurality of different nodes in cooperation with one another.

A light relay 150 may be a micro relay node of a terminal level. The light relay 150 may connect to the BS 110 via a wireless backhaul link, and may have a maximum transmission power of 30 decibel-milliwatts (dBm) (1 mW) Also, the light relay 150 may have mobility, and may have a reduced functionality compared to a general terminal. For example, the light relay 150 may provide basic control, such as channel estimation, amplification or quantization of a received mixed signal being, and signal forwarding.

The light relay 150 may operate at, for example, a maximum transmission power of 200 milliwatts (mW).

The light relays 150 may be installed in any location, and may include, for example, machine-to-machine (M2M) devices of various classes and a wireless mesh BS. The light relays 150 may be referred to as soft-infra nodes.

The light relays 150 are capable of transmitting data and control information using a first radio resource, for example, an LTE frequency band, and a second radio resource, for example, an mmWave band.

A more detailed description of the light relay 150 is provided below with reference to FIG. 2.

Figure 2:
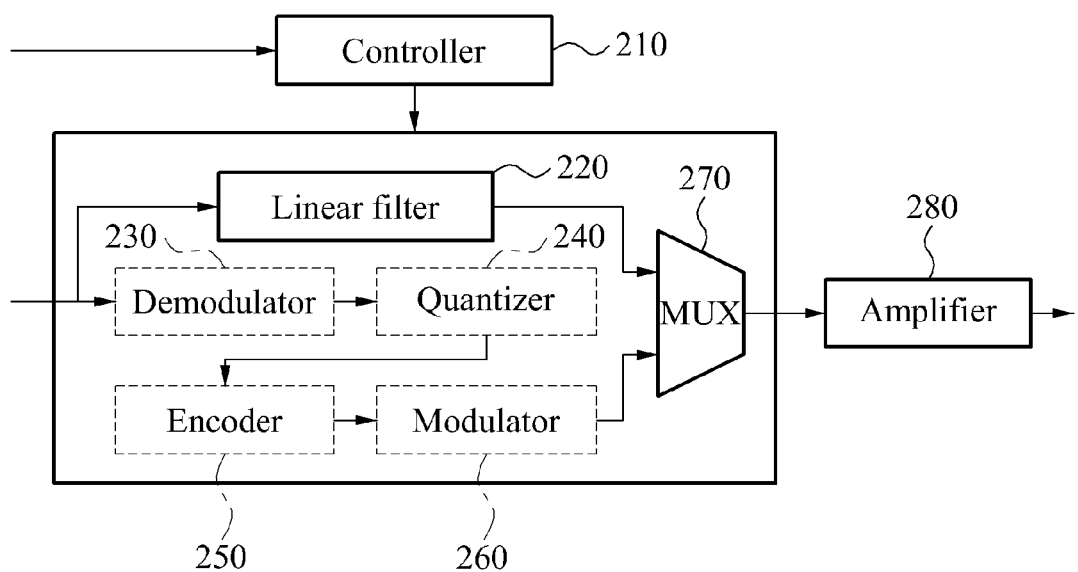
FIG. 2 is a diagram illustrating an example of a structure of a light relay.

FIG. 2 is a diagram illustrating an example of a structure of a light relay. Referring to FIG. 2, the light relay includes a controller 210, a linear filter 220, a demodulator 230, a quantizer 240, an encoder 250, a modulator 260, a multiplexer or mux 270, and an amplifier 280.

The controller 210 calculates a coefficient of the linear filter 220 included in the light relay, and determines a quantization level of the quantizer 240. Also, the controller 210 generates information necessary for cooperative transmission.

The controller 210 may be installed in any location, for example, in a cellular BS, a server, a personal terminal, or a light relay, depending on an operating scheme.

The controller 210 controls the operation of the light relay based on received information.

The linear filter 220 changes a phase or amplitude of an analog signal input to the light relay without performing decoding. The phase or amplitude may be controlled by a coefficient for neutralizing interference in a multi-hop environment, or a coefficient for maximizing an effective signal to interference plus noise ratio (SINR) between a final transmitting end and a final receiving end.

The demodulator 230 extracts a value of a symbol from the input analog signal.

The quantizer 240 quantizes the analog signal input to the light relay without performing decoding.

The quantizer 240 includes a function for dynamic control of a quantization level, and may adjust, for example, a length of a symbol for quantization. The quantizer 240 may support vector quantization allowing concurrent quantization of a plurality of symbols, as well as symbol-by-symbol scalar quantization.

The quantizer 240 may control the accuracy of the quantization. For example, the quantizer 240 may quantize the input signal at a level of a noise signal or at a more accurate level.

The encoder 250 performs channel coding to transmit a digital signal produced by quantizing the analog signal.

The modulator 260 maps the channel-coded digital signal to an analog signal.

The multiplexer 270 may combine the analog signal passed through the linear filter 220 and the analog signal passed through the quantizer 240 into a mixed signal and forward the mixed signal to an external device, or may select and forward one of the analog signals to an external device.

The amplifier 280 amplifies the analog signal produced through the multiplexer 270 to match an output power of the light relay.

Figure 3:
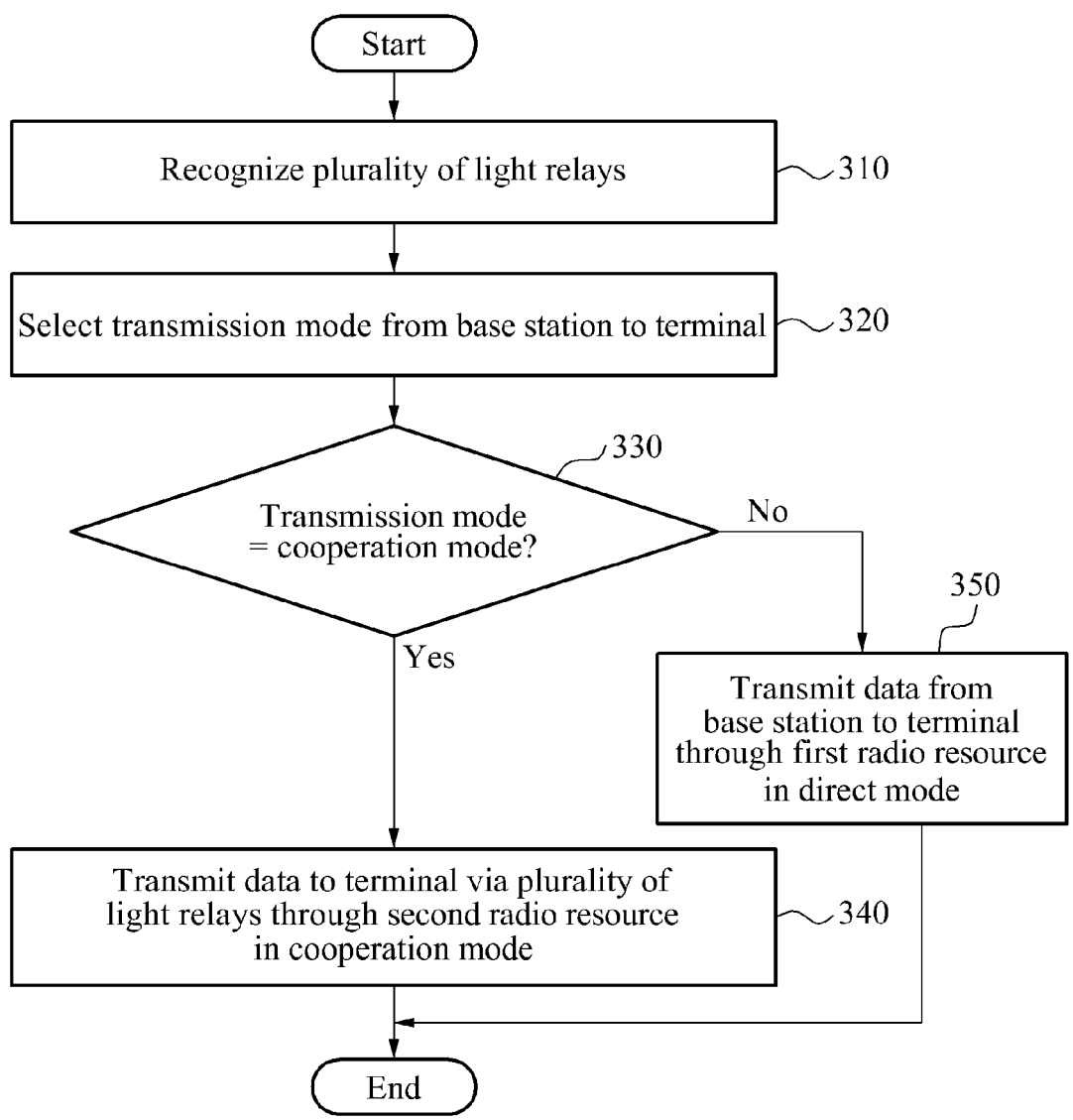
FIG. 3 is a flowchart illustrating an example of a method of multi-hop cooperative communication from a base station.

FIG. 3 is a flowchart illustrating an example of a method of multi-hop cooperative communication from a BS. Referring to FIG. 3, in operation 310, a BS for multi-hop cooperative communication, hereinafter referred to simply as a BS, recognizes a plurality of light relays included in a network for multi-hop cooperative communication. The light relays amplify or quantize and forward mixed signals received from a plurality of different nodes in cooperation with one another.

In operation 320, the BS selects a transmission mode from a direct mode and a cooperation mode. The direct mode is a mode in which a BS transmits data to a terminal or a plurality of terminals directly. The cooperation mode is a mode in which a BS transmits data to a terminal or a plurality of terminals in cooperation with a plurality of light relays.

In operation 330, the BS determines whether the selected transmission mode is a cooperation mode.

In operation 340, when the selected transmission mode is determined to be a cooperation mode in operation 330, the BS transmits data to a terminal via the plurality of light relays through a second radio resource in the cooperation mode. When data is to be transmitted to a plurality of terminals, the BS may transmit data to the plurality of terminals concurrently. The second radio resource may include an mmWave band.

In operation 350, when the selected transmission mode is determined to be a non-cooperation mode, that is, a direct mode, in operation 330, the BS transmits data to a terminal directly through a first radio resource in the direct mode. The first radio resource may include an LTE frequency band.

Figure 4:
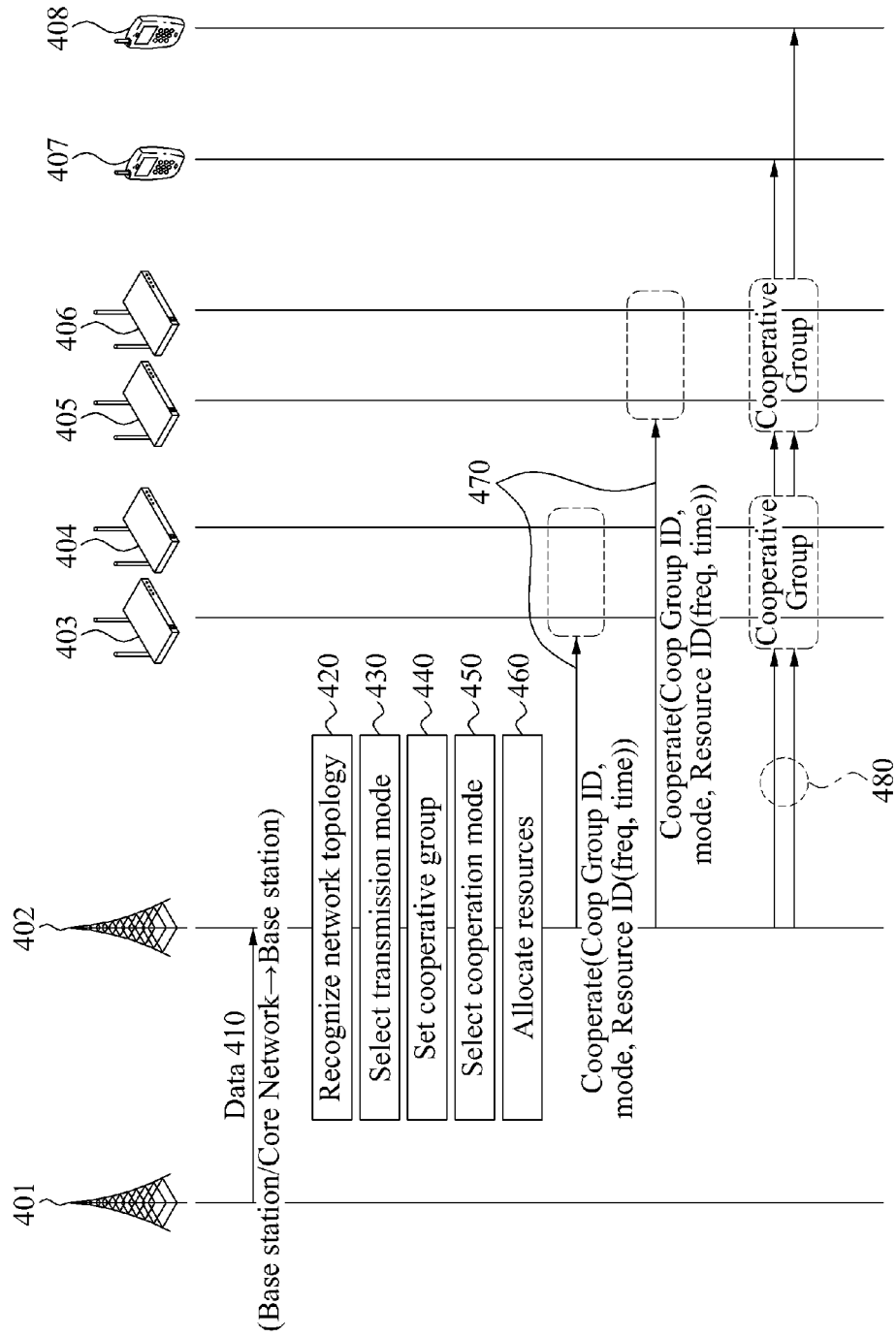
FIG. 4 is a diagram illustrating an example of communication in a cooperation mode in a network for multi-hop cooperative communication including light relays.

FIG. 4 is a diagram illustrating an example of communication in a cooperation mode in a network for multi-hop cooperative communication including light relays. Referring to FIG. 4, the network for multi-hop cooperative communication including light relays includes a neighboring BS 401, a BS 402, a plurality of light relays 403, 404, 405, and 406, and user equipment (UEs) 407 and 408. The neighboring BS 401 may correspond to a core network, and the UEs 407 and 408 may be terminals being served by the BS 402. Also, the BS 402 may be a BS communicating using an mmWave band.

The plurality of light relays 403, 404, 405, and 406 may serve as a relay node, called a soft-infra node, and may include, for example, M2M nodes of various classes and a wireless mesh BS.

The BS 402 may transmit data received from the neighboring BS 401 to the UEs 407 and 408. FIG. 4 illustrates traffic transmission between users of different cells.

In operation 410, the neighboring BS 401 informs the BS 402 that the BS 401 has data to be transmitted to the UEs 407 and 408. The BS 402 may have difficulty transmitting data to the UEs 407 and 408 directly due to the frequency properties in the mmWave band.

In operation 420, the BS 402 recognizes the plurality of light relays 403, 404, 405, and 406 in the network through network topology recognition. The plurality of light relays 403, 404, 405, and 406 amplify or quantize and forward mixed signals received from a plurality of different nodes in cooperation with one another.

In operation 430, the BS 402 selects a transmission mode for the data requested by the neighboring BS 401 to be transmitted to the UEs 407 and 408. For example, the BS 402 may select a transmission mode from a direct mode and a cooperation mode. The direct mode is a mode in which data is transmitted directly from the BS 402, and may be referred to as a BS mode. The cooperation mode is a mode in which data is transmitted from a BS using relay nodes, for example, light relays, and may be referred to as a multi-hop P2P mode.

When the direct mode is selected to be the transmission mode in operation 430, the BS 402 transmits the data to the UEs 407 and 408 directly through a first radio resource.

When the cooperation mode is selected to be the transmission mode in operation 430, the BS 402 transmits the data to the UEs 407 and 408 via the plurality of light relays 403, 404, 405, and 406 through a second radio resource.

A case in which the cooperation mode is selected in operation 430 will be described below.

In operation 440, the BS 402 sets light relays operating in cooperation with the BS 402 to be a cooperative group or a relay group to transmit data to the UEs 407 and 408 concurrently among the plurality of light relays 403, 404, 405, and 406 in the network of the BS 402. Also, the BS 402 may determine a session for the light relays set to be a cooperative group.

For example, the BS 402 may set a first light relay 403 and a second light relay 404 to be a cooperative group, and may set a third light relay 405 and a fourth light relay 406 to be a cooperative group. The cooperative group of the first light relay 403 and the second light relay 404 may support multi-hop multi-session-based concurrent transmission, and the cooperative group of the third light relay 405 and the fourth light relay 406 may support multi-hop multi-session-based concurrent transmission.

In operation 450, the BS 402 selects a cooperation mode for a cooperative group of light relays operating in cooperation with the BS 402, for example, the first light relay 403 and the second light relay 404 set to be a cooperative group. For example, the BS 402 may select a cooperation mode from an amplify-and-forward mode, a decode-and-forward mode, and a compress-and-forward mode.

In operation 460, the BS 402 allocates resources for the cooperative group of light relays operating in cooperation with the BS 402.

In operations 440 through 460, the BS 402 determines how to set a plurality of light relays being served by the BS 402 to be cooperative groups, and determines how to transmit data to light relays in each group, for example, by determining a point in time of transmission, a type of frequency resource to be used, and a transmission mode.

In operation 470, the BS 402 transmits a cooperation context to the cooperative group of light relays operating in cooperation with the BS 402. For example, the BS 402 may transmit the cooperation context by transmitting a message such as, for example, Cooperate(Coop Group ID, mode, Resource ID(freq, time)) to the cooperative group of light relays operating in cooperation with the BS 402. In this example, the cooperation context includes a cooperative group identification (ID), a cooperation mode, and an allocated resource ID for the cooperative group of light relays operating in cooperation with the BS 402.

For example, the first light relay 403 and the second light relay 404 may have the same cooperative group ID, and the third light relay 405 and the fourth light relay 406 may have the same cooperative group ID. The first light relay 403 and the second light relay 404 having the same cooperative group ID may transmit data in cooperation with one another, and the third light relay 405 and the fourth light relay 406 having the same cooperative group ID may transmit data in cooperation with one another.

Accordingly, the BS 402 may identify the cooperation context for cooperation between the first light relay 403 and the second light relay 404 and the cooperation context between the third light relay 405 and the fourth light relay 406, and may optimize the cooperation context.

In operation 480, the BS 402 transmits the data received from the neighboring BS 401 to the first light relay 403 and the second light relay 404 having the same cooperative group ID, the first light relay 403 and the second light relay 404 transmit the data to the third light relay 405 and the fourth light relay 406 having the same cooperative group ID, and the third light relay 405 and the fourth light relay 406 transmit the data to the UEs 407 and 408. Although FIG. 4 shows transmitting data from the BS 402 to the UEs 407 and 408 via two cooperative groups, this is merely an example, and the data may be transmitted via one cooperative group or via three or more cooperative groups.

The data may be transmitted from the BS 402 to the UEs 407 and 408 via the cooperative group of the first light relay 403 and the second light relay 404 and the cooperative group of the third light relay 405 and the fourth light relay 406 concurrently through interference exploitation-based transmission.

Interference exploitation-based transmission refers to data transmission using cooperation between relays, rather than removing an interference signal introduced into each relay, and may include, for example, interference neutralization and noisy network coding.

Figure 5:
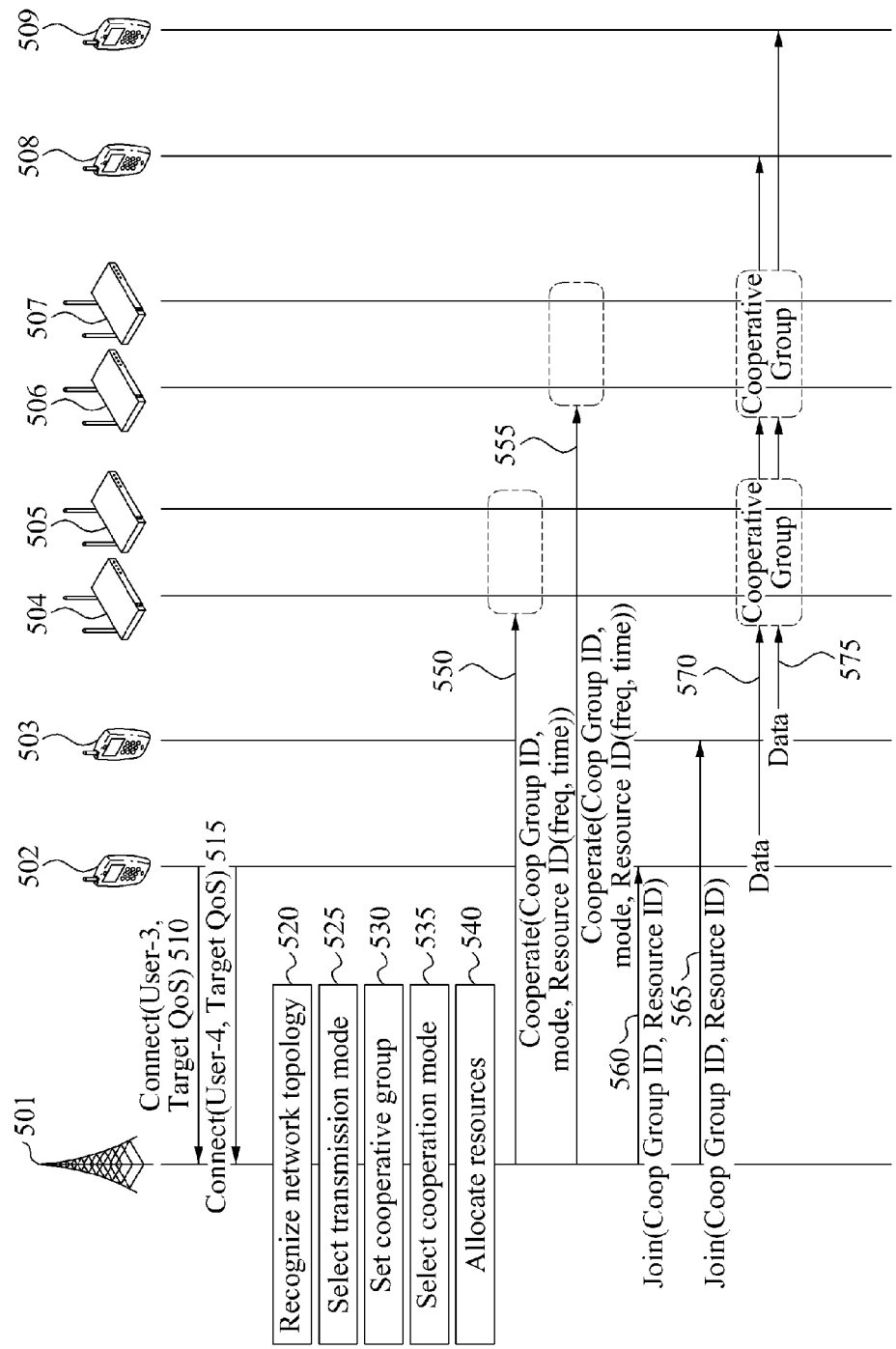
FIG. 5 is a diagram illustrating another example of communication in a cooperation mode in a network for multi-hop cooperative communication including light relays.

FIG. 5 is a diagram illustrating another example of communication in a cooperation mode in a network for multi-hop cooperative communication including light relays. The network for multi-hop cooperative communication including light relays includes a BS 501, a plurality of light relays 504, 505, 506, and 507, and a plurality of UEs 502, 503, 508, and 509.

The plurality of UEs 502, 503, 508, and 509 may be terminals being served by the BS 501, and the BS 501 may be a BS communicating using an mmWave band.

FIG. 5 illustrates data transmission from the UEs 502 and 503 to the UEs 508 and 509 inside the cell served by the BS 501, that is, traffic transmission between users of the same cell.

In operation 510, the UEs 502 and 503 inform the BS 501 that they have data to be transmitted to the UEs 508 and 509, and provide information associated with a target quality of service (QoS) that the UEs 502 and 503 desire to receive. The UEs 502 and 503 may inform the BS 501 that they have data to be transmitted and provide information associated with a target QoS by transmitting messages such as, for example, Connect(User-3, Target QoS) and Connect(User-4, Target QoS) to the BS 501.

In operation 520, the BS 501 recognizes the plurality of light relays 504, 505, 506, and 507 in the network. The plurality of light relays 504, 505, 506, and 507 amplify or quantize and forward mixed signals received from a plurality of different nodes in cooperation with one another.

In operation 525, the BS 501 selects a transmission mode for the data requested by the UEs 502 and 503 to be transmitted to the UEs 508 and 509. For example, the BS 501 may select a transmission mode from a direct mode and a cooperation mode. The direct mode is a mode in which data may be transmitted directly from a BS, and may be referred to as a BS mode. The cooperation mode is a mode in which data may be transmitted from a UE using relay nodes, for example, light relays, and may be referred to as a multi-hop P2P mode.

When the direct mode is selected to be the transmission mode in operation 525, the BS 501 transmits the data to the UEs 508 and 509 directly through a first radio resource in the direct mode.

When the cooperation mode is selected to be the transmission mode in operation 525, the UEs 502 and 503 transmit the data to the UEs 508 and 509 via the plurality of light relays 504, 505, 506, and 507 through a second radio resource in the cooperation mode.

A case in which the cooperation mode is selected in operation 525 will be described below.

In operation 530, the BS 501 sets light relays operating in cooperation with the BS 501 to be a cooperative group or a relay group to transmit data to the UEs 508 and 509 concurrently among the plurality of light relays 504, 505, 506, and 507 in the network of the BS 501. Also, the BS 501 may determine a session for the light relays set to be a cooperative group.

For example, the BS 501 may set a first light relay 504 and a second light relay 505 to be a cooperative group, and may set a third light relay 506 and a fourth light relay 507 to be a cooperative group. The cooperative group of the first light relay 504 and the second light relay 505 may support multi-hop multi-session-based concurrent transmission, and the cooperative group of the third light relay 506 and the fourth light relay 507 may support multi-hop multi-session-based concurrent transmission.

In operation 535, the BS 501 selects a cooperation mode for a cooperative group of light relays operating in cooperation with the BS 501, for example, the first light relay 504 and the second light relay 505. For example, the BS 501 may select a cooperation mode from an amplify-and-forward mode, a decode-and-forward mode, and a compress-and-forward mode.

In operation 540, the BS 501 allocates resources for the cooperative group of light relays operating in cooperation with the BS 501.

In operations 530 and 540, the BS 501 determines how to set a plurality of light relays being served by the BS 501 to be cooperative groups, and determines how to transmit data to light relays in each group, for example, by determining a point in time of transmission, a type of frequency resource to be used, and a transmission mode.

In operations 550 and 555, the BS 501 provides a cooperation context to the cooperative group of light relays operating in cooperation with the BS 501. For example, the BS 501 may provide the cooperation context by transmitting a message such as, for example, Cooperate(Coop Group ID, mode, Resource ID(freq, time)) to the cooperative group of light relays operating in cooperation with the BS 501. In this example, the cooperation context includes a cooperative group ID, a cooperation mode, and an allocated resource ID for the cooperative group of light relays operating in cooperation with the BS 501.

For example, the first light relay 504 and the second light relay 505 may have the same cooperative group ID, and the third light relay 506 and the fourth light relay 507 may have the same cooperative group ID. The first light relay 504 and the second light relay 505 having the same cooperative group ID may transmit data in cooperation with one another, and the third light relay 506 and the fourth light relay 507 having the same cooperative group ID may transmit data in cooperation with one another.

Accordingly, the BS 501 may identify the cooperation context for cooperation between the first light relay 504 and the second light relay 505 and the cooperation between the third light relay 506 and the fourth light relay 507, and may optimize the cooperation context.

In operations 560 and 565, the BS 501 provides the cooperation context to each of the UEs 502 and 503 desiring to transmit data. For example, the BS 501 may provide the cooperation context by transmitting a message such as, for example, Join(Coop Group ID, Resource ID) to each of the UEs 502 and 503 desiring to transmit data. In this example, the cooperation context includes a cooperative group ID and an allocated resource ID for the cooperative group of light relays operating in cooperation with the BS 501.

In operations 570 and 575, the UEs 502 and 503 transmit the data to the first light relay 504 and the second light relay 505 having the same cooperative group ID, the first light relay 504 and the second light relay 505 transmit the data to the third light relay 506 and the fourth light relay 507 having the same cooperative group ID, and the third light relay 506 and the fourth light relay 507 transmit the data to the UEs 508 and 509, based on the cooperation context provided by the BS 501. Although FIG. 5 shows transmitting data from the UEs 502 and 503 to the UEs 508 and 509 via two cooperative groups, this is merely an example, and the data may be transmitted via one cooperative group or via three or more cooperative groups.

The data may be transmitted from the UEs 502 and 503 to the UEs 508 and 509 via the cooperative group of the first light relay 504 and the second light relay 505 and the cooperative group of the third light relay 506 and the fourth light relay 507 concurrently through interference exploitation-based transmission.

Figure 6:
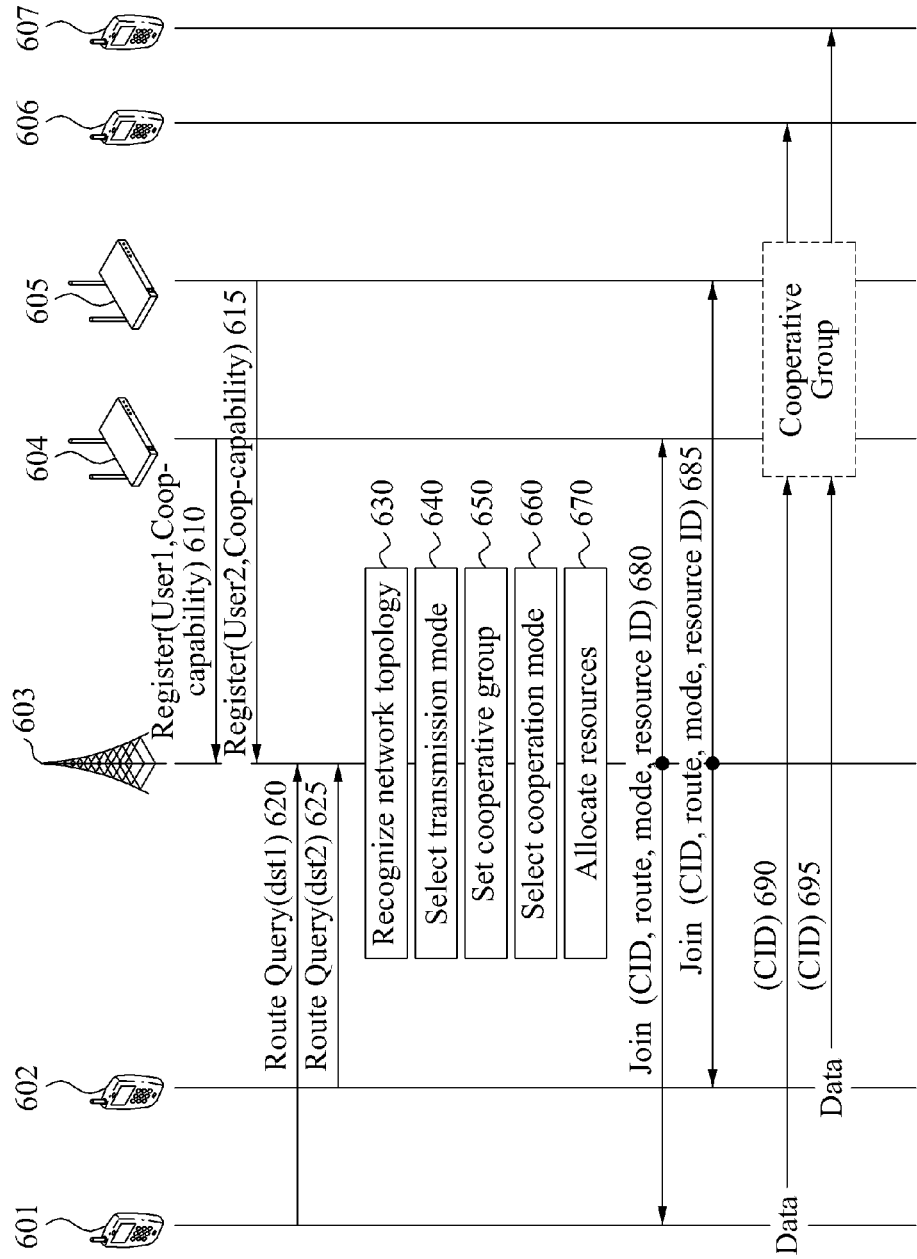
FIG. 6 is a diagram illustrating another example of communication in a cooperation mode in a network for multi-hop cooperative communication including light relays.

FIG. 6 is a diagram illustrating another example of communication in a cooperation mode in a network for multi-hop cooperative communication including light relays. The network for multi-hop cooperative communication including light relays includes a connection server 603, a plurality of light relays 604 and 605, and a plurality of UEs 601, 602, 606, and 607.

The connection server 603 may communicate using an mmWave band, and may serve as a BS.

FIG. 6 illustrates data transmission from the UEs 601 and 602 to the UEs 606 and 607 through the connection server 603.

In operations 610 and 615, the connection server 603 receives a request for registration from the plurality of light relays 604 and 605. For example, the plurality of light relays 604 and 605 may inform the connection server 603 that they have a cooperative transmission capability by transmitting messages such as, for example, Register(User1, Coop-capability) and Register(User2, Coop-capability) to the connection server 603.

In operation 620 and 625, the UEs 601 and 602 inform the connection server 603 that they have data to be transmitted to the UEs 606 and 607. For example, the UEs 601 and 602 may inform the connection server 603 that they have data to be transmitted by transmitting messages such as, for example, Route Query(dst1) and Route Query(dst2) to the connection server 603. Also, the UEs 601 and 602 may provide the connection server 603 with information associated with a target QoS that the UEs 601 and 602 desire to receive in response to the request.

In operation 630, the connection server 603 recognizes the plurality of light relays 604 and 605 in the network. The plurality of light relays 604 and 605 amplify or quantize and forward mixed signals received from a plurality of different nodes in cooperation with one another.

In operation 640, the connection server 603 selects a transmission mode for the data requested by the UEs 601 and 602 to be transmitted to the UEs 606 and 607. For example, the connection server 603 may select a transmission mode from a direct mode and a cooperation mode. The direct mode is a mode in which data is transmitted directly from the connection server 603. The cooperation mode is a mode in which data is transmitted from a UE using relay nodes, for example, light relays.

When the direct mode is selected to be the transmission mode in operation 640, the connection server 603 transmits the data to the UEs 606 and 607 directly through a first radio resource in the direct mode.

When the cooperation mode is selected to be the transmission mode in operation 640, the UEs 601 and 602 transmit the data from the UEs 601 and 602 to the UEs 606 and 607 via the plurality of light relays 604 and 605 through a second radio resource in the cooperation mode.

A case in which the cooperation mode is selected in operation 640 will be described below.

In operation 650, the connection server 603 sets light relays operating in cooperation with one another to be a cooperative group or a relay group to transmit the requested data to the UEs 606 and 607 concurrently among the plurality of light relays 604 and 605. Also, the connection server 603 may determine a session for the light relays set to be a cooperative group.

For example, the connection server 603 may set a first light relay 604 and a second light relay 605 to be a cooperative group. The cooperative group of the first light relay 604 and the second light relay 605 may support multi-hop multi-session-based concurrent transmission.

In operation 660, the connection server 603 selects a cooperation mode for a cooperative group of light relays operating in cooperation with one another, for example, the first light relay 604 and the second light relay 605. For example, the connection server 603 may select a cooperation mode from an amplify-and-forward mode, a decode-and-forward mode, and a compress-and-forward mode.

In operation 670, the connection server 603 allocates resources for the cooperative group of light relays operating in cooperation with one another.

In operations 680 and 685, the connection server 603 provides a cooperation context to the UEs 601 and 602 and the cooperative group of light relays, for example, the first light relay 604 and the second light relay 605. For example, the connection server 603 may provide the cooperation context by transmitting a message such as, for example, Join(CID, route, mode, resource ID) to the UEs 601 and 602 and the cooperative group of light relays, for example, the first light relay 604 and the second light relay 605. In this example, the cooperation context includes a cooperative group ID (CID), a route indicating light relays to be used by the UEs 601 and 602 to reach the UEs 606 and 607, a mode indicating a cooperation mode for the cooperative group identified by the CID, and an allocated resource ID for the cooperative group of light relays operating in cooperation with one another.

For example, the first light relay 604 and the second light relay 605 may have the same cooperative group ID. The first light relay 604 and the second light relay 605 having the same cooperative group ID transmit data in cooperation with one another.

Accordingly, the connection server 603 may identify the cooperation context for cooperation between the first light relay 604 and the second light relay 605, and may optimize the cooperation context.

In operations 690 and 695, the UEs 601 and 602 transmit the data to the first light relay 604 and the second light relay 605 through the allocated resources based on the cooperation context. The first light relay 604 and the second light relay 605 in the same cooperative group transmit the data to the UEs 606 and 607 concurrently through interference exploitation-based transmission. Although FIG. 6 shows transmitting data from the UEs 601 and 602 to the UEs 606 and 607 via one cooperative group, this is merely an example, and the data may be transmitted via two or more cooperative groups.

In another example, the connection server 603 may provide information on available transmission schemes to the UEs 601 and 602, rather than providing a cooperative group ID, a route, and an allocated resource ID as in the example described above, to allow the UEs 601 and 602 to select a route and a scheme for data transmission directly. Also, the connection server 603 may set a cooperative group and may allocate a resource based on the selected result.

Figure 7:
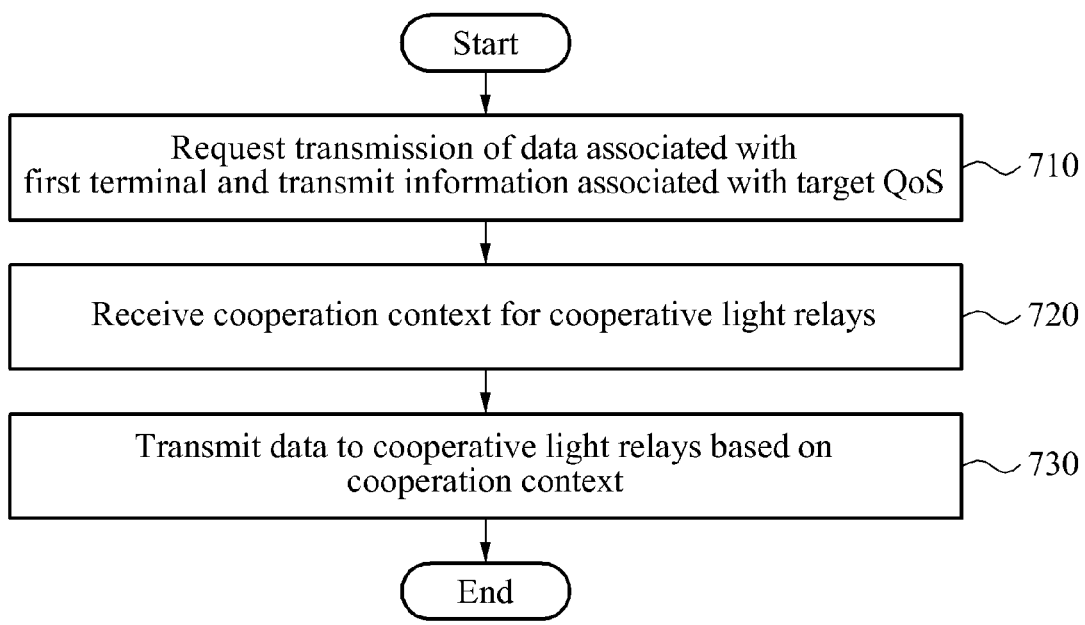
FIG. 7 is a flowchart illustrating an example of a method of multi-hop cooperative communication from a terminal.

FIG. 7 is a flowchart illustrating an example of a method of multi-hop cooperative communication from a terminal. FIG. 7 illustrates a communication method of transmitting data from a terminal in the network of FIG. 6.

In operation 710, a terminal for multi-hop cooperative communication, hereinafter referred to as a terminal, transmits, to a BS, a request for data transmission to a first terminal and a target QoS that the terminal desires to receive in response to the request. The first terminal may be a terminal to which data is to be transmitted from the corresponding terminal, and there may be one terminal or a plurality of terminals.

In operation 720, the terminal receives a cooperation context from the BS in response to the request. The cooperation context may be context information associated with at least two light relays operating in cooperation with one another to transmit data, and may include, for example, a cooperative group ID and an allocated resource ID for at least two light relays operating in cooperation with one another.

In operation 730, the terminal transmits data to the at least two light relays for multi-hop multi-session concurrent transmission based on the received cooperation context.

FIG. 8 is a diagram illustrating an example of a control channel structure for a cooperative framework in a network for multi-hop cooperative communication including light relays. Referring to FIG. 8, the network for multi-hop cooperative communication includes a BS, a plurality of terminals, and a plurality of light relays or soft-infra terminals, and 2-tier access communication between the BS and each terminal may be implemented.

Communications may be implemented in the network with respect to two control axes including a first communication 810 between the BS and the plurality of light relays, or between the BS and the plurality of terminals, and a second communication 830 between the plurality of light relays, or between the plurality of terminals and the plurality of light relays. The first communication 810 and the second communication 830 may each be performed using either TDD (time division duplexing) or FDD (frequency division duplexing).

The first communication 810 may be implemented by a BS-based control, and the BS may use a high frequency band, for example, an mmWave band. In the mmWave band, long-distance signal propagation may be limited due to a low line of sight (LoS).

In one example, a first radio resource, for example, a partial range or a full range of a low frequency band, such as an LTE frequency band, may be used as a control channel for the first communication 810 to transmit uplink/downlink control information over a long distance, and a second radio resource, for example, a high frequency band, such as an mmWave band, may be used as a data channel for the first communication 810.

The second communication 830 may be implemented by a light relay-based control.

Since control between each device for the second communication 830 may occur within a relatively short distance, the second radio resource, for example, the mmWave band, may be used as a control channel for the second communication 830. For this purpose, mPDCCH may be defined as a physical downlink control channel in the mmWave band, and mPUCCH may be defined as a physical uplink control channel in the mmWave band. The prefix "m" indicates a use of a channel in a high frequency band, such as the mmWave band. The mPDCCH may be defined as a channel in which a function of a physical downlink control channel (PDCCH) may be implemented in the mmWave band, and the mPUCCH may be defined as a channel in which a function of a physical uplink control channel (PUCCH) may be implemented in the mmWave band.

The first radio resource, for example, the LTE frequency band, that is used as the control channel for the first communication 810 may also be used as a control channel for the second communication 830. When the first radio resource is also used as a control channel for the second communication 830, the control channel for the first communication 810 and the control channel for the second communication 830 may be used on a time division basis. In one example, the first radio resource may be divided temporally and used to achieve a distributed protocol operation without control channel collision between the BS, the light relays, and the terminals.

Radio resources may be allocated for an uplink 813 and a downlink 815 of the first communication 810, and an uplink 833 and a downlink 835 of the second communication 830.

For example, at least a partial range of an LTE frequency band may be allocated for the uplink 813 and the downlink 815 to transmit control information of the first communication 810, and an LTE frequency band may be allocated for the uplink 833 of the second communication 830 to transmit control information, and an mmWave band may be allocated for the downlink 835 of the second communication 830 to transmit control information.

Figure 9:
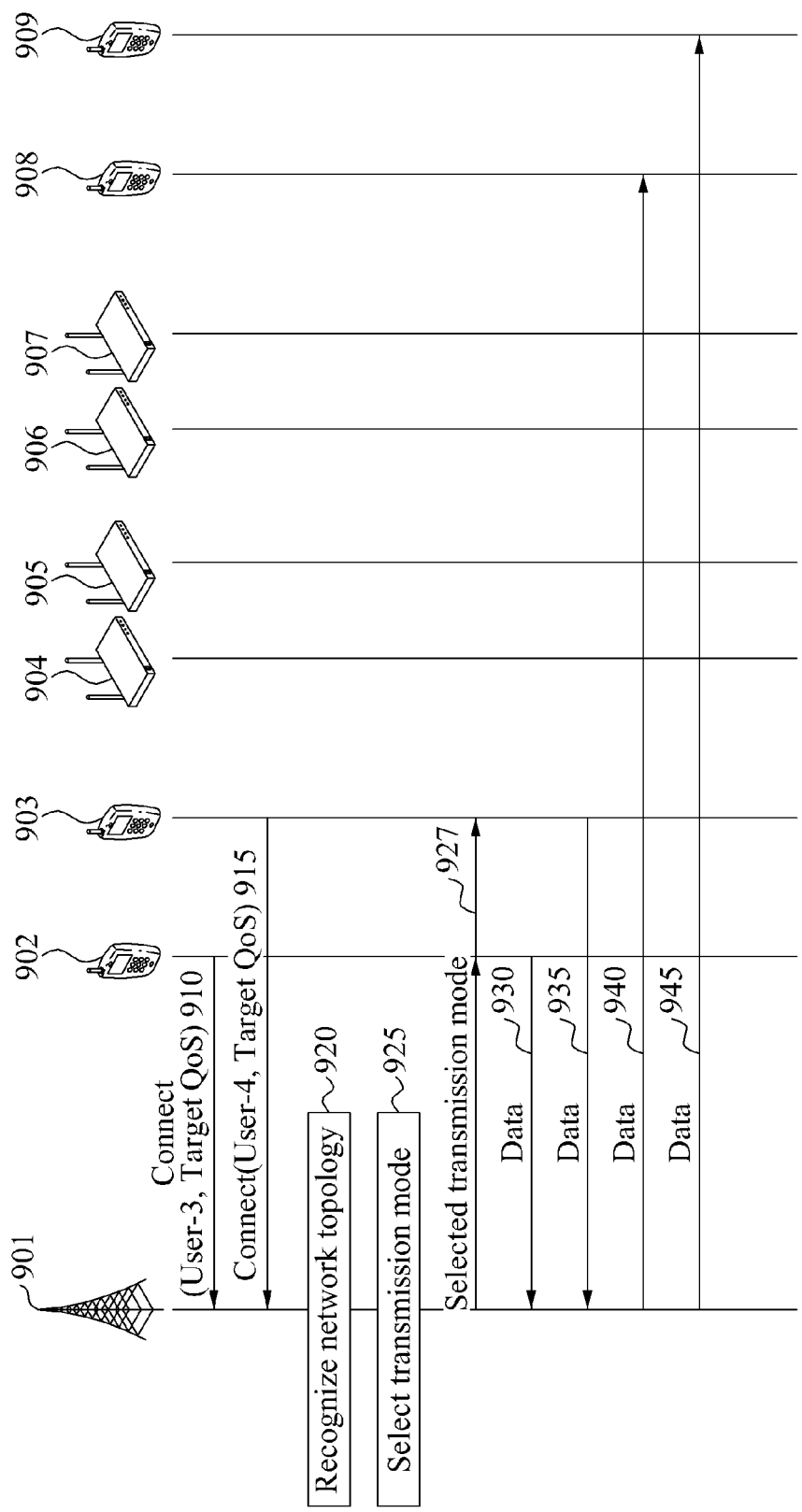
FIG. 9 is a diagram illustrating an example of communication in a direct mode in a network for multi-hop cooperative communication including light relays.

FIG. 9 is a diagram illustrating an example of communication in a direct mode in a network for multi-hop cooperative communication including light relays. The network for multi-hop cooperative communication including light relays includes a BS 901, a plurality of light relays 904, 905, 906, and 907, and a plurality of UEs 902, 903, 908, and 909.

The plurality of UEs 902, 903, 908, and 909 may be terminals being served by the BS 901, and the BS 901 may be a BS communicating using an mmWave band.

FIG. 9 illustrates data transmission from the UEs 902 and 903 to the UEs 908 and 909 inside the cell served by the BS 901, that is, traffic transmission between users of the same cell.

In operation 910, the UEs 902 and 903 inform the BS 901 that they have data to be transmitted to the UEs 908 and 909, and provide information associated with a target quality of service (QoS) that the UEs 902 and 903 desire to receive. The UEs 902 and 903 may inform the BS 901 that they have data to be transmitted and provide information associated with a target QoS by transmitting messages such as, for example, Connect(User-3, Target QoS) and Connect(User-4, Target QoS) to the BS 901.

In operation 920, the BS 901 recognizes the plurality of light relays 904, 905, 906, and 907 in the network. The plurality of light relays 904, 905, 906, and 907 amplify or quantize and forward mixed signals received from a plurality of different nodes in cooperation with one another.

In operation 925, the BS 901 selects a transmission mode for the data requested by the UEs 902 and 903 to be transmitted to the UEs 908 and 909. For example, the BS 901 may select a transmission mode from a direct mode and a cooperation mode. The direct mode is a mode in which data may be transmitted directly from a BS, and may be referred to as a BS mode. The cooperation mode is a mode in which data may be transmitted from a UE using relay nodes, for example, light relays, and may be referred to as a multi-hop P2P mode.

When the direct mode is selected to be the transmission mode in operation 925, the BS 901 transmits the data to the UEs 908 and 909 directly through a first radio resource in the direct mode.

When the cooperation mode is selected to be the transmission mode in operation 925, the UEs 902 and 903 transmit the data to the UEs 908 and 909 via the plurality of light relays 904, 905, 906, and 907 through a second radio resource in the cooperation mode.

A case in which the direct mode is selected in operation 925 will be described below.

In operation 927, the BS 901 transmits information associated with the selected transmission mode to the UEs 902 and 903. For example, the BS 901 may inform the UEs 902 and 903 that the direct mode is selected to be the transmission mode in operation 927 and then may receive data from the UEs 902 and 903 using an uplink in operations 930 and 935.

In operation 930, the UE 902 transmits data to be transmitted to the UE 908 to the BS 901, and in operation 935, the UE 903 transmits data to be transmitted to the UE 909 to the BS 901.

In operation 940, the BS 901 transmits the data received from the UE 902 directly to the UE 908 through the first radio resource in the direct mode, and in operation 945, the BS 901 transmits the data received from the UE 903 directly to the UE 909 through the first radio resource in the direct mode.

The examples described above enable overlapping use of frequency resources to lead to efficient utilization of limited frequency resources and meet the demand for a service from a rapidly increasing number of communication terminals without affecting the cellular communication performance.

The examples described above enable a network for distributed multi-hop multi-session-based concurrent transmission to be implemented efficiently.

As a non-exhaustive illustration only, the various terminals and user equipment (UEs) described herein may be a mobile device, such as a cellular phone, a personal digital assistant (PDA), a digital camera, a portable game console, an MP3 player, a portable/personal multimedia player (PMP), a handheld e-book, a portable laptop PC, a global positioning system (GPS) navigation device, a tablet, a sensor, or a stationary device, such as a desktop PC, a high-definition television (HDTV), a DVD player, a Blue-ray player, a set-top box, a home appliance, or any other device known to one of ordinary skill in the art that is capable of wireless communication and/or network communication.

The controller 210, the linear filter 220, the demodulator 230, the quantizer 240, the encoder 250, the modulator 260, the multiplexer or mux 270, and the amplifier 280 illustrated in FIG. 2, and the various base stations, terminals, and light relays illustrated in FIGS. 1, 4-6, 8, and 9 that perform the various operations illustrated in FIGS. 1 and 3-9 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of multi-hop cooperative communication, performed by a base station comprising:
    identifying a plurality of relays configured to cooperate with one another to amplify and forward scheme or quantize and forward scheme;
    selecting a transmission mode for transmission of data to at least one of a plurality of terminals among a direct mode and a cooperation mode for transmission via the plurality of relays;
    transmitting data to the terminal based on radio resources in a first band in the direct mode in response to the selected transmission mode being the direct mode; and
    transmitting control information for transmitting data to the terminal to the terminal based on radio resources in the first band, and transmitting the data corresponding to the control information to the terminal via the plurality of relays based on radio resources in a second band in the cooperation mode in response to the selected transmission mode being the cooperation mode.

2. The method of claim 1, wherein the transmitting of the data to the terminal in the cooperation mode comprises:
    setting relays operating in cooperation with the base station among the plurality of relays to be a cooperative group; and
    allocating a resource for the relays of the cooperative group.

3. The method of claim 2, wherein the cooperative group comprises at least two relays, and is a cooperative group configured to support multi-hop multi-session concurrent transmission; and the allocating of the resource comprises allocating the resource to the at least two relays of the cooperative group.

4. The method of claim 2, further comprising:, selecting a cooperation mode from an amplify-and-forward mode, a decode-and-forward mode, and a compress-and-forward mode as a cooperation mode for the relays of the cooperative group;

providing a cooperation context to the relays of the cooperative group; and transmitting data received from another base station to the relays of the cooperative group based on the cooperation context.

5. The method of claim 4, wherein the cooperation context comprises any one or any combination of a cooperative group identification (ID), an allocated resource, and a cooperation mode for the relays of the cooperative group.

6. The method of claim 1, wherein the first radio resource comprises a long term evolution (LTE) frequency band, and the second radio resource comprises a millimeter wave (mmWave) band.

7. The method of claim 1, further comprising:

recognizing a plurality of relays configured to receive mixed signals and quantize received signals and amplify quantized signals and forward amplified signals and cooperate with one another;

selecting a transmission mode for transmission of data from at least one first terminal to a second terminal among a plurality of terminals from a cooperation mode for transmission from a first terminal desiring to transmit data to a second terminal via the plurality of relays, and a base station (BS) mode for direct transmission of data received from the first terminal to the second terminal, based on the second terminal;

transmitting the data received from the first terminal to the second terminal through a first radio resource in the BS mode in response to the BS mode being the selected transmission mode; and transmitting control information for transmitting data to the second terminal to the second terminal through the first radio resource in the cooperation mode in response to the cooperation mode being the selected transmission mode, wherein when the base station transmits the control information in the cooperation mode, the first terminal transmits data to the second terminal concurrently via the plurality of relays through a second radio resource of a band different from the first radio resource, and at least one of the plurality of relays transmits data to other relays concurrently using an interference utilization based transmission scheme.

8. The method of claim 7, further comprising receiving, from the first terminal, a request for data transmission to the second terminal, and information associated with a target quality of service (QoS) that the first terminal desires to receive in response to the request.

9. The method of claim 7, wherein the transmitting of the control information to the second terminal in the cooperation mode comprises:

setting relays operating in cooperation with the base station among the plurality of relays to be a cooperative group; and allocating a resource for the relays of the cooperative group.

10. The method of claim 9, wherein the cooperative group comprises at least two relays, and is a cooperative group configured to support multi-hop multi-session concurrent transmission; and the allocating of the resource comprises allocating the resource to the at least two relays of the cooperative group.

11. The method of claim 9, further comprising; transmitting a cooperation context to the first terminal, the cooperation context comprising an allocated resource identification (ID) and a cooperative group ID for the relays of the cooperative group;

transmitting the cooperation text and a detailed mode of the cooperation mode to the relays of the cooperative group.

12. The method of claim 9, further comprising selecting a cooperation mode from an amplify-and-forward mode, a decode-and-forward mode, and a compress-and-forward mode as a cooperation mode for the relays of the cooperative group.

13. The method of claim 11, wherein the cooperation context comprises any one or any combination of a cooperative group ID, an allocated resource, and a cooperation mode for the relays of the cooperative group.

14. The method of claim 1, further comprising:

receiving a registration request from a plurality of relays;

selecting a transmission mode for transmission of data from at least one first terminal desiring to transmit data to at lest one second terminal among a plurality of terminals, from a cooperation mode for transmission of data received from the first terminal to the second terminal via the plurality of relays, and a base station (BS) mode for direct transmission of data received from the first terminal to the second terminal, in response to the registration request;

transmitting the data received from the first terminal to the second terminal through a first radio resource in the BS mode in response to the BS mode being the selected transmission mode; and transmitting control information for transmitting data to the second terminal to the second terminal through the first radio resource, and transmitting the data received from the first terminal to the second terminal concurrently via the plurality of relays through a second radio resource, of a band different from the first radio resource, in the cooperation mode in response to the cooperation mode being the selected transmission mode, wherein at least one of the plurality of relays transmits data to other relays concurrently using an interference utilization based transmission scheme.

15. The method of claim 14, wherein the plurality of relays are capable of cooperating with the base station or one another to amplify and quantize and forward mixed signals received from different nodes.

16. The method of claim 14, wherein the transmitting of the data to the second terminal in the cooperation mode comprises:

setting relays operating in cooperation with one another among the plurality of relays to be a cooperative group configured to transmit the data to the second terminal; and allocating a resource for the relays of the cooperative group, wherein the cooperative group comprises at least two relays, and is a cooperative group configured to support multi-hop multi-session concurrent transmission; and the allocating of the resource for the relays comprises allocating the resource to the at least two relays of the cooperative group.

17. A method of multi-hop cooperative communication, performed by a terminal comprising:

transmitting, to a base station through a first radio resource, a request for data transmission to at least one reception terminal, and information associated with a target quality of service (QoS) that the first terminal desires to receive in response to the request;

receiving, from the base station through the first radio resource, a cooperation context in response to the request, the cooperation context comprising an allocated resource identification (ID) and a cooperative group ID for at least two relays operating in cooperation with one another, selected based on information about the target QoS for the transmission, set to be a cooperative group configured to support multi-hop multi session concurrent transmission to transmit the data to the reception terminal, in response to the request; and transmitting the data to the reception terminal via the at least two relays of the cooperative group based on the cooperation context, wherein when transmitting the data to the reception terminal, the base station transmits control information for transmitting data to the reception terminal to the reception terminal concurrently through the first radio resource, and at least one of the plurality of relays transmits data to other relays concurrently using an interference utilization based transmission scheme.

18. A method of multi-hop cooperative communication, performed by a relay comprising:

receiving, from a base station, cooperation context including an allocated resource identification (ID) and a cooperative group ID:

receiving data from a transmission terminal or the base station through a second radio resource, matched to the allocated resource ID, of a band different from a first radio resource used when the base station transmits data directly, based on the cooperation context; and transmitting data to a reception terminal via at least one of a plurality of relays for supporting multi-hop multi-session concurrent transmission through the second radio resource based on the cooperation context, wherein when transmitting the data to the reception terminal, the base station transmits control information for transmitting data to the reception terminal to the reception terminal concurrently through the first radio resource, and the plurality of relays transmits data to other relays concurrently using an interference utilization based transmission scheme.

19. The method of claim 18, wherein each of the plurality of relays comprises:

a linear filter configured to change a phase or an amplitude of an analog signal input to the relay;

a quantizer configured to quantize the analog signal input to the relay; and an encoder configured to perform channel coding to transmit the quantized analog signal, wherein the linear filter is further configured to change the phase or amplitude of the analog signal according to a coefficient for neutralizing interference in a multi-hop environment and a coefficient for maximizing an effective signal to interference plus noise ratio (SINR) between a final transmitting end and a final receiving end, and the quantizer is further configured to adjust a quantization level and an accuracy of a quantization for the analog signal.

20. The method of claim 18, further comprising:

transmitting a registration request to a base station;

receiving, from the base station cooperation context including an allocated resource identification (ID) and a cooperative group ID;

receiving data from the base station through a second radio resource, matched to the allocated resource ID, of a band different from a first radio resource used when the base station transmits data directly, based on the cooperation context; and transmitting data to a reception terminal via at least one of a plurality of relays for supporting multi-hop multi-session concurrent transmission through the second radio resource based on the cooperation context, wherein when transmitting the data to the reception terminal, the base station transmits control information for transmitting data to the reception terminal to the reception terminal concurrently through the first radio resource, and the plurality of relays transmits data to other relays concurrently using an interference utilization based transmission scheme.

21. A base station for performing a method of multi-hop cooperative communication, comprising:

a processor configured to:

identify a plurality of relays configured to cooperate with one another to amplify and forward scheme or quantize and forward scheme; and select a transmission mode for transmission of data to at least one of a plurality of terminals among a direct mode and a cooperation mode for transmission via the plurality of relays;

a transmitter configured to:

transmit data to the terminal based on radio resources in a first band in the direct mode in response to the selected transmission mode being the direct mode; and transmit control information for transmitting data to the terminal to the terminal based on radio resources in a first band, and transmit the data corresponding to the control information to the terminal via the plurality of relays based on radio resources in a second band in the cooperation mode in response to the selected transmission mode being the cooperation mode.

22. A terminal for performing a method of multi-hop cooperative communication, comprising:

a transmitter configured to:

transmit, to a base station through a first radio resource, a request for data transmission to at least one reception terminal, and information associated with a target quality of service (QoS) that the first terminal desires to receive in response to the request;

a receiver configured to:

receiving, from the base station through the first radio resource, a cooperation context in response to the request, the cooperation context comprising an allocated resource identification (ID) and a cooperative group ID for at least two relays operating in cooperation with one another, selected based on information about the target QoS for the transmission, set to be a cooperative group configured to support multi-hop multi-session concurrent transmission to transmit the data to the reception terminal, in response to the request, wherein the transmitter transmits the data to the reception terminal via the at least two relays of the cooperative group based on the cooperation context, and when transmitting the data to the reception terminal, the base station transmits control information for transmitting data to the reception terminal to the reception terminal concurrently through the first radio resource, and at least one of the plurality of relays transmits data to other relays concurrently using an interference utilization based transmission scheme.

23. A relay for performing a method of multi-hop cooperative communication, comprising:

a receiver configured to:

receive, from a base station, cooperation context including an allocated resource identification (ID) and a cooperative group ID; and receive data from a transmission terminal or the base station through a second radio resource, matched to the allocated resource ID, of a band different from a first radio resource used when the base station transmits data directly, based on the cooperation context;

a transmitter configured to:

transmit data to a reception terminal via at least one of a plurality of relays for supporting multi-hop multi-session concurrent transmission through the second radio resource based on the cooperation context, wherein when transmitting the data to the reception terminal, the base station transmits control information for transmitting data to the reception terminal to the reception terminal concurrently through the first radio resource, and the plurality of relays transmits data to other relays concurrently using an interference utilization based transmission scheme.

* * * * *